(12) United States Patent
Mardell

(10) Patent No.: US 6,640,448 B2
(45) Date of Patent: Nov. 4, 2003

(54) LIQUID DEFLECTING DEVICE

(75) Inventor: Alison Mardell, London (GB)

(73) Assignee: Chamberlain Clarke Ltd., London (GB)

( * ) Notice: Subject to any disclaimer, the term of this patent is extended or adjusted under 35 U.S.C. 154(b) by 0 days.

(21) Appl. No.: 10/025,825

(22) Filed: Dec. 18, 2001

(65) Prior Publication Data

US 2002/0092176 A1 Jul. 18, 2002

(51) Int. Cl.[7] .................................................. A47J 43/28
(52) U.S. Cl. ........................................... 30/327; 30/324
(58) Field of Search .......................... 30/141, 324, 328, 30/327, 298.4, 325, 326; D7/653, 659, 660, 662, 663

(56) References Cited

U.S. PATENT DOCUMENTS

| | | | | |
|---|---|---|---|---|
| D20,773 S | * | 5/1891 | Crowell, Jr. | D7/653 |
| D25,193 S | * | 2/1896 | Horton | D7/653 |
| D28,788 S | * | 6/1898 | Williams | D7/653 |
| D29,725 S | * | 11/1898 | Williams | D7/653 |
| D37,240 S | * | 11/1904 | Codman | D7/661 |
| 2,810,958 A | * | 10/1957 | Monti | 30/327 |
| D277,656 S | * | 2/1985 | Johnston et al. | D11/81 |

FOREIGN PATENT DOCUMENTS

| | | | |
|---|---|---|---|
| DE | 33 33 422 | * | 4/1985 |
| GB | 2199728 A | | 7/1988 |

* cited by examiner

*Primary Examiner*—Hwei-Siu Payer
(74) *Attorney, Agent, or Firm*—Townsend and Townsend and Crew LLP

(57) ABSTRACT

The present invention provides for a liquid deflecting device which can be in the form of a spoon (10) and which has a bowl having an undersurface presenting a first generally concave region forming a pour depression (20) and arranged to receive liquid delivered onto the device (10), a second region (22) arranged to be in communication with the first region (20) by means of a lip (24) and allowing for the controlled escape of liquid therefrom, and the second region (22) presenting a laterally extending surface over which the flow escaping from the first portion (20) flows when being dispensed from the device (10).

13 Claims, 2 Drawing Sheets

LIQUID DEFLECTING DEVICE

CROSS-REFERENCES TO RELATED APPLICATIONS

This application claims the benefit of UK Patent Application 0030853.6, filed on Dec. 18, 2000, the entirety of which is incorporated herein by reference for all purposes.

BACKGROUND OF THE INVENTION

The present invention relates to a liquid deflecting device and in particular, but not exclusively, to a liquid deflecting device for use when dispensing a liquid beverage and/or liquid dairy product.

Liquid deflecting devices are commonly used in commercial and domestic catering activities particularly when a liquid beverage, or liquid dairy product, needs to be dispensed in an accurate and controlled manner.

The requirement for dispensing a liquid dairy product in an accurate and controlled manner arises particularly in relation to the preparation of beverages, and often warm beverages, which are designed to have a layer of a liquid dairy product dispensed for flotation upon the upper surface thereof. Irish or Gaelic coffee comprises one such beverage in which black coffee laced with a liqueur or spirit such as whisky is served in a glass and is arranged to have a layer of cream dispensed thereon so as to float on top of the coffee.

Similar techniques can be employed with other beverages.

The flotation of a uniform cream layer can prove to be an essential component of the final beverage to be presented for consumption. Thus, since at the time of cream dispensation, the coffee has already been prepared and laced with a potentially expensive liqueur or spirit, it is important that the cream is dispensed accurately so as to achieve the required effect since any failure in the quality and presentation of the cream layer is likely to require that all of the beverage be discarded and thus wasted.

Unfortunately, success in achieving the desired flotation of a cream layer on such beverages requires skill and practice and this can lead to a potentially high percentage of failures when attempting to prepare such beverage.

The current technique is to employ the back of a chilled spoon, i.e., the convex surface thereof, which spoon has to be held at a correct level and angular orientation relative to the upper surface of the beverage while the cream has to be delivered onto the convex surface of the back of the spoon within a particular range of angles. Also, the flow of cream onto the back of the spoon has to be carefully regulated and, to some extent, the temperature of the spoon ahs to be maintained so as to remain in a relatively chilled state.

As will be appreciated, the requirement for providing the aforementioned factors renders the accurate dispensation of a floating cream layer when producing beverages such as Irish or Gaelic coffee relatively problematic particularly for the inexperienced.

BRIEF SUMMARY OF THE INVENTION

The present invention seeks to provide for a liquid deflecting device having an advantage over known devices, i.e., an upturned spoon, as currently employed. In particular, the present invention seeks to provide a liquid deflecting device that can assist with at least one of the aforementioned requirements for successfully floating a layer of cream on to a beverage such as Irish or Gaelic coffee.

According to one embodiment of the present invention there is provided a liquid deflecting device comprising a first generally concave region arranged to receive liquid delivered onto the device, a second region arranged to be in communication with the first region so as to allow for the controlled escape of liquid therefrom and arranged to present a laterally extending surface over which the said liquid escaping from the first portion flows when being dispensed from the surface.

In accordance with one embodiment of the deflecting device of the present invention, the first generally concave region provides a ready target region upon which cream can be poured. The communication between the first generally concave region and the laterally extending surface of the second region allows for delivery of the cream to the said laterally extending surfaces in an easily controlled manner. Once the liquid is delivered to the said laterally extending surface in such a controlled manner, then the dispensation of the liquid from that laterally extending surface of the deflecting device follows as a matter of course.

Thus, an individual using the deflecting device merely has to concentrate on pouring the liquid into the first generally concave region at a rate of flow not exceeding that which would lead to the total overflow of the concave region, and so the present invention can then advantageously be employed when preparing beverages such as Irish or Gaelic coffee.

In one embodiment, the first generally concave region is in communication with the second region by way of a channel formation provided in an upper wall region of the said concave region. In addition, the channel formation comprises a lip formed in the wall of the concave region.

According to one embodiment of the invention, the liquid deflecting device includes a recess for providing for the accurate mounting of the device relative to, for example, a beverage containing receptacle. Advantageously, the recess is also arranged to locate the deflecting device at a desired orientation relative to a wall of the receptacle.

In one embodiment, the laterally extending surface comprises a substantially cambered surface which, in particular, can comprise a substantially convex surface.

In another embodiment, the second region has a bottom surface defined by said substantially convex surface and a top surface opposite said bottom surface, and defined by a substantially concave surface.

In another embodiment, the liquid deflecting device therefore takes on the form of a spoon and can also be provided with a handle region.

As will therefore be appreciated, the liquid deflecting device of the present invention can comprise a spoon having a bottom surface comprising a convex portion in communication with a concave portion, the two said portions being in communication.

In one embodiment, the present invention comprises an Irish or Gaelic coffee spoon.

In another embodiment, the liquid deflecting device is formed from any appropriate material having regard to the liquid to be dispensed but, in particular, the device can be formed from a metal such as sterling silver.

BRIEF DESCRIPTION OF THE DRAWINGS

The invention is described further hereinafter by way of example only, with reference to the accompanying drawings in which.

DETAILED DESCRIPTION OF THE INVENTION

Figure 1:
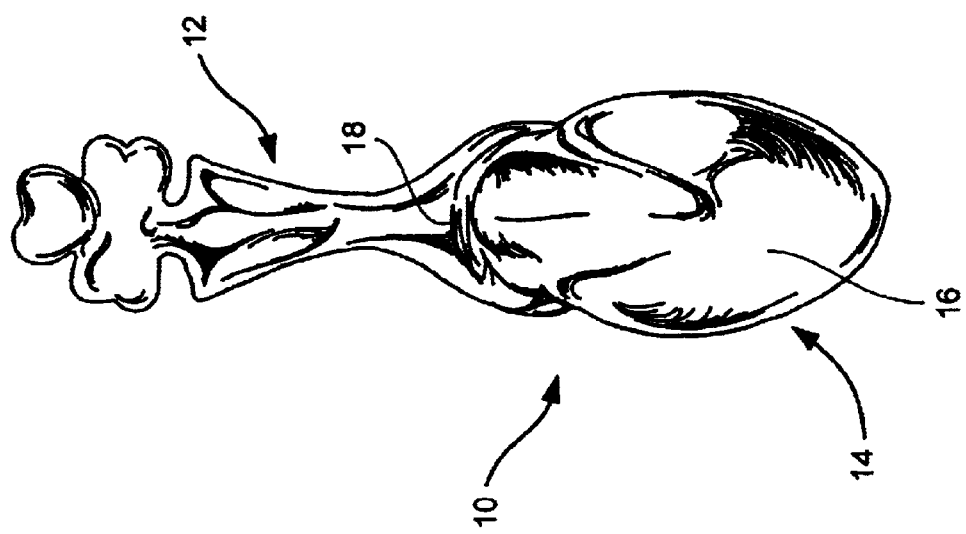
FIG. 1 is a plan view of a liquid deflecting device according to an embodiment of the present invention and illustrating the top surface thereof.

Turning now to FIG. 1, there is illustrated a plan view of a liquid deflecting device 10 and which shows the top surface thereof. As discussed below, liquid deflecting device 10 can act as a so-called Irish or Gaelic coffee spoon and can perform other general spoon functions.

The liquid deflecting device 10 comprises a handle portion 12 and a bowl portion 14 including a bowl 16, which is arranged to perform the normal functions of a spoon's bowl.

Figure 2:
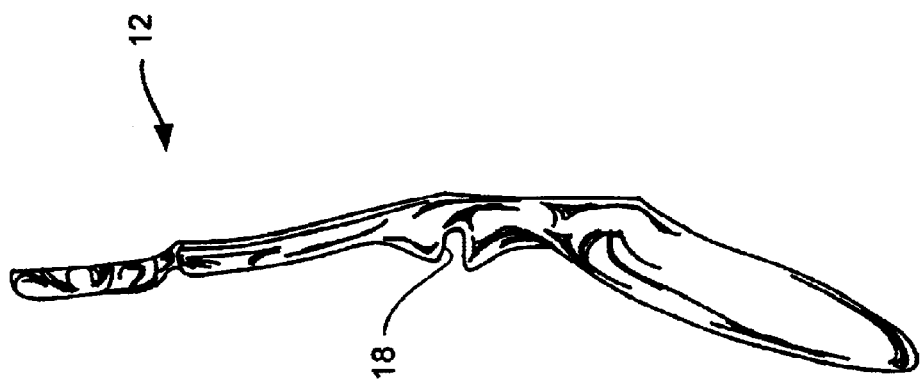
FIG. 2 is a side elevational view of the liquid deflecting device of FIG. 1.

Located in the body region of the liquid deflecting device 10 at which the handle 12 joins the bowl portion 14 there is provided an arcuate notch 18 shown more clearly with reference to FIG. 2.

As will be described further later, the arcuate notch 18 is arranged for the mounting of the spoon 10 onto the rim of a glass, or other beverage-containing receptacle, for the accurate dispensation of a layer of cream onto a charge of coffee already received in the receptacle.

Figure 3:
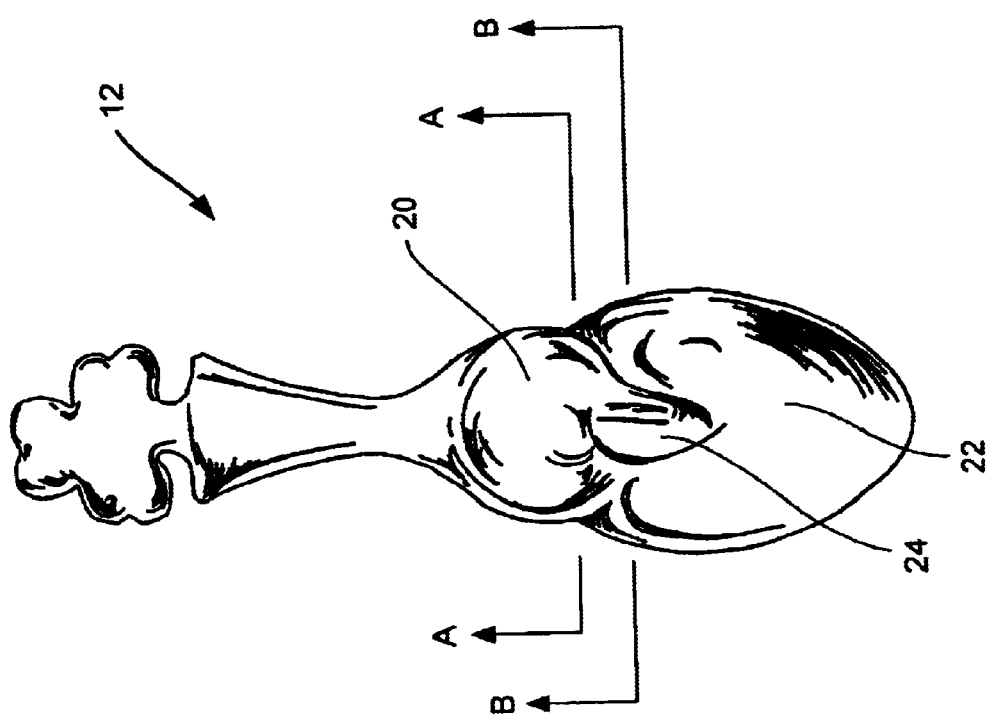
FIG. 3 is a plan view of the liquid deflecting device of FIGS. 1 and 2 and showing the bottom surface thereof.

Turning now to FIG. 3, there is illustrated a plan view of the underside of the liquid deflecting device 10 and which indicates that the undersurface of the bowl region 14 is in fact formed by two separate regions. The first of these regions comprises a pour depression 20 which itself represents a concave surface within the underside of the liquid deflecting device. The second region comprises the convex laterally extending rear surface 22 of the bowl 16 and which represents the surface of the back of the liquid deflecting device 10 over which cream is to flow at the time of being dispenses onto the coffee. The pour depression 20 and convex surface 22 are in communication by means of a notch or lip 24 formed in an upper region of the wall of the pour depression 20, and which provides for a ready means for delivering cream that is poured into the pour depression 20 onto the convex surface 22 of the spoon 10.

Figure 5:
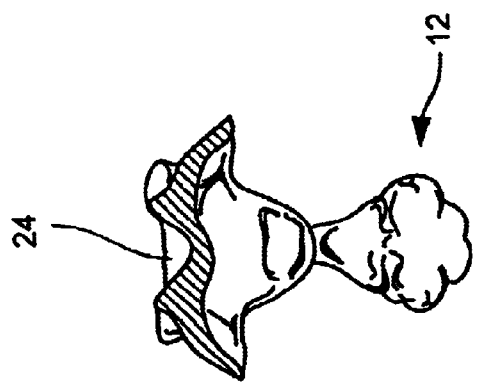
FIG. 5 is a transverse sectional view of the liquid deflecting device taken on the line B—B of FIG. 3.
Figure 4:
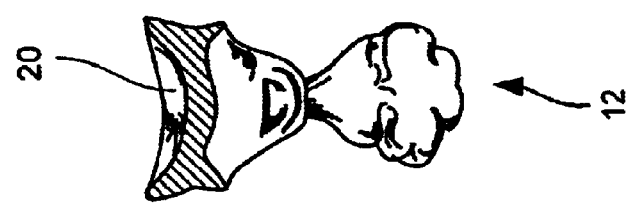
FIG. 4 is a transverse sectional view of the liquid deflecting device taking on the line A—A of FIG. 3.

The cross-sections of FIGS. 4 and 5 provide further illustration of the configuration of the pour depression 20 and lip 24.

In use, the liquid deflecting device 10 can be employed in a normal spoon manner, for example for dispensing sugar and for stirring purposes. However, when, for example, cream is to be dispensed onto a charge of coffee laced with a liqueur or spirit so as to form a so-called Irish or Gaelic coffee, the liquid deflecting device 10 is effectively turned upside down and mounted onto the rim of the coffee-containing receptacle such as a glass by means of the notch 18 illustrated with reference to FIGS. 1 and 2.

Then, cream is poured into the pour depression 20 at a flow rate which prevents total overflow of the pour depression 20, but which allows for the steady escape of the cream from the pour depression 20 via the lip 24 to the convex surface 22 of the bowl region 14 of the liquid deflecting device 10. The cream thereby escaping from the pour depression flows over the laterally extending convex surface 22 and is thereby dispensed from the back of the liquid deflecting device 10 in a readily controlled and accurate manner.

Thus, the provision of the inter-communicating pour depression 20 and laterally extending convex surface 22 provide for means whereby the flow of a liquid such as cream can be accurately controlled so as to achieve a high success rate when preparing beverages such as Irish or Gaelic coffee. Yet further, the mounting means such as the notch 18 for mounting the liquid deflecting device 10 relative to a beverage-containing receptacle provides for accurate orientation of the liquid deflecting device 10 relative to the surface of the beverage so to further improve the accuracy and reliability with which beverages such as Irish or Gaelic coffee can be prepared.

In one embodiment, the liquid deflecting device 10 is formed from sterling silver and, as can be seen, it is also presented with a decorative handle region 12.

It should be appreciated that the invention is not restricted to the details of the foregoing embodiment. For example, the liquid deflecting device 10 need not take on the form of a spoon and the regions forming the pour depression 20, communicating channel 24 and laterally extending surface 22 can be provided in any appropriate form, and with any appropriate relative dimensions and indeed can be formed from any appropriate material. Also, the means 18 for accurately locating the deflecting device on to, for example, a receptacle wall, can take any appropriate form.

What is claimed is:

1. A liquid deflecting device comprising a first generally concave region arranged to receive liquid delivered onto the device, a second region arranged to be in communication with the first region so as to allow for the controlled escape of liquid from the first region and arranged to present a laterally extending surface over which the said liquid escaping from the first region flows when being dispensed from the device; wherein the first generally concave region is in communication with the second region by means of a channel formation.

2. The device as recited in claim 1, wherein the channel formation comprises a lip formation.

3. The device as recited in claim 1, further comprising means for mounting the device onto a receptacle wall.

4. The device as recited in claim 3, wherein the mounting means comprises a recess formed in a body of the device.

5. The device as recited in claim 3, wherein the mounting means is arranged to allow for accurate angular location of the device relative to the receptacle wall.

6. The device as recited in claim 1, wherein the laterally extending surface comprises a substantially cambered surface.

7. The device recited in claim 6, wherein the substantially cambered surface comprises a substantially convex surface.

8. The device as recited in claim 7, wherein the second region has an underside surface defined by the convex surface and an upper side surface defined by a concave surface.

9. The device as recited in claim 8, wherein the device is a spoon.

10. The device as recited in claim 9, wherein the spoon comprises a front surface and a back surface, the back surface comprising the first region, the second region and the channel formation of the liquid deflecting device.

11. The device as recited in claim 10, wherein the spoon is adapted for use in making Irish coffee.

12. The device as recited in claim 9, wherein the spoon is adapted for use in making Irish coffee.

13. The device as recited in claim 1, wherein the liquid deflecting device is formed of sterling silver.

* * * * *